United States Patent
Milster et al.

(10) Patent No.: US 12,189,141 B2
(45) Date of Patent: Jan. 7, 2025

(54) MULTI-ORDER DIFFRACTIVE FRESNEL LENS (MOD-DFL) AND SYSTEMS THAT INCORPORATE THE MOD-DFL

(71) Applicant: Arizona Board of Regents on Behalf of the University of Arizona, Tucson, AZ (US)

(72) Inventors: Thomas D. Milster, Tucson, AZ (US); Daniel Apai, Tucson, AZ (US); Lee C. Johnson, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 901 days.

(21) Appl. No.: 17/256,044

(22) PCT Filed: Jun. 28, 2019

(86) PCT No.: PCT/US2019/039829
§ 371 (c)(1),
(2) Date: Dec. 24, 2020

(87) PCT Pub. No.: WO2020/006411
PCT Pub. Date: Jan. 2, 2020

(65) Prior Publication Data
US 2021/0190998 A1 Jun. 24, 2021

Related U.S. Application Data

(60) Provisional application No. 62/691,892, filed on Jun. 29, 2018.

(51) Int. Cl.
*G02B 5/18* (2006.01)
*G01J 3/02* (2006.01)
(Continued)

(52) U.S. Cl.
CPC .............. *G02B 3/08* (2013.01); *G01J 3/0208* (2013.01); *G01J 3/0297* (2013.01); *G01J 3/12* (2013.01);
(Continued)

(58) Field of Classification Search
CPC ........ G02B 3/08; G02B 5/1876; G02B 23/00; G01J 3/0208; G01J 3/0297; G01J 3/12; G01J 2003/1208; G01J 2003/1213
See application file for complete search history.

(56) References Cited

U.S. PATENT DOCUMENTS

| 4,068,126 A | * | 1/1978 | Wilson | G01T 1/1645 250/363.02 |
| 4,069,812 A | * | 1/1978 | O'Neill | F24S 20/20 359/743 |

(Continued)

FOREIGN PATENT DOCUMENTS

| CN | 101114053 | 1/2008 |
| CN | 203275764 | 11/2013 |

OTHER PUBLICATIONS

International Search Report and Written Opinion dated Oct. 2, 2019 in co-pending PCT Application No. PCT/US2019/039829.
(Continued)

*Primary Examiner* — Roy M Punnoose
(74) *Attorney, Agent, or Firm* — Thomas | Horstemeyer, LLP

(57) ABSTRACT

A multi-order diffractive Fresnel lens (MOD-DFL) that is suitable for use in a space telescope for studying transiting earth-like planets of distant stars is provided. The MOD-DFL may comprise a MOD-DFL array comprising a plurality of MOD-DFL segments that are secured to a mounting surface of a deployment device, such as a balloon, for example, in a preselected arrangement to form the MOD-DFL. An array telescope may be formed of an array of
(Continued)

deployment devices, such as an array of balloons, for example, each having a MOD-DFL secured to a mounting surface of the respective deployment device, an optics system disposed inside of the respective deployment device, and a camera disposed inside of the respective deployment device. Each MOD-DFL comprises a plurality of MOD-DFL segments arranged in a preselected arrangement to form the respective MOD-DFL.

18 Claims, 13 Drawing Sheets

(51) Int. Cl.
    *G01J 3/12*     (2006.01)
    *G02B 3/08*     (2006.01)

(52) U.S. Cl.
    CPC .... *G02B 5/1876* (2013.01); *G01J 2003/1208* (2013.01); *G01J 2003/1213* (2013.01)

(56) References Cited

U.S. PATENT DOCUMENTS

| | | | | |
|---|---|---|---|---|
| 4,312,330 | A * | 1/1982 | Holdridge | F24S 50/80 136/246 |
| 4,514,040 | A * | 4/1985 | Pinelli | F24S 23/10 359/837 |
| 5,117,306 | A * | 5/1992 | Cohen | G02B 27/0037 359/743 |
| 5,539,622 | A * | 7/1996 | Ishikawa | G03B 15/05 362/18 |
| 5,566,023 | A * | 10/1996 | Kley | G03F 7/0005 359/569 |
| 5,589,982 | A * | 12/1996 | Faklis | G02B 5/1876 359/569 |
| 5,818,634 | A * | 10/1998 | Richard | H04M 1/027 359/809 |
| 6,219,185 | B1 | 4/2001 | Hyde | |
| 6,676,262 | B1 | 1/2004 | Vernois | |
| 6,958,868 | B1 * | 10/2005 | Pender | F24S 23/10 136/246 |
| 7,952,017 | B2 * | 5/2011 | Repetto | F24S 23/31 136/246 |
| 11,671,706 | B2 * | 6/2023 | Milster | G02B 27/0056 348/345 |
| 2002/0196547 | A1 | 12/2002 | Kleeman et al. | |
| 2006/0050234 | A1 * | 3/2006 | Morris | A61F 2/1613 623/6.3 |
| 2010/0302654 | A1 * | 12/2010 | Amano | G02B 3/08 359/742 |
| 2012/0255540 | A1 * | 10/2012 | Hutchin | F24S 30/452 126/600 |
| 2014/0204592 | A1 * | 7/2014 | Miyashita | G02B 19/0028 362/311.06 |
| 2016/0370599 | A1 | 12/2016 | Tabirian | |
| 2018/0074325 | A1 * | 3/2018 | Wheelwright | G02B 27/0176 |
| 2021/0190998 | A1 * | 6/2021 | Milster | G02B 3/08 |
| 2021/0297601 | A1 * | 9/2021 | Milster | G02B 5/188 |

OTHER PUBLICATIONS

Faklis, Dean. "Diffractive lenses create new opportunities." Optics and Photonics News 6.10 (1995): 28-39, Fig 1(b); p. 29-30 [online] URL< https://www.osapublishing.org/opn/abstract.cfm?uri=opn-6-10-28.

Lu, et al., "Large-area rainbow holographic diffraction gratings on a curved surface using transferred photopolymer films", Optics Letters, vol. 43, No. 4, Feb. 2018.

* cited by examiner

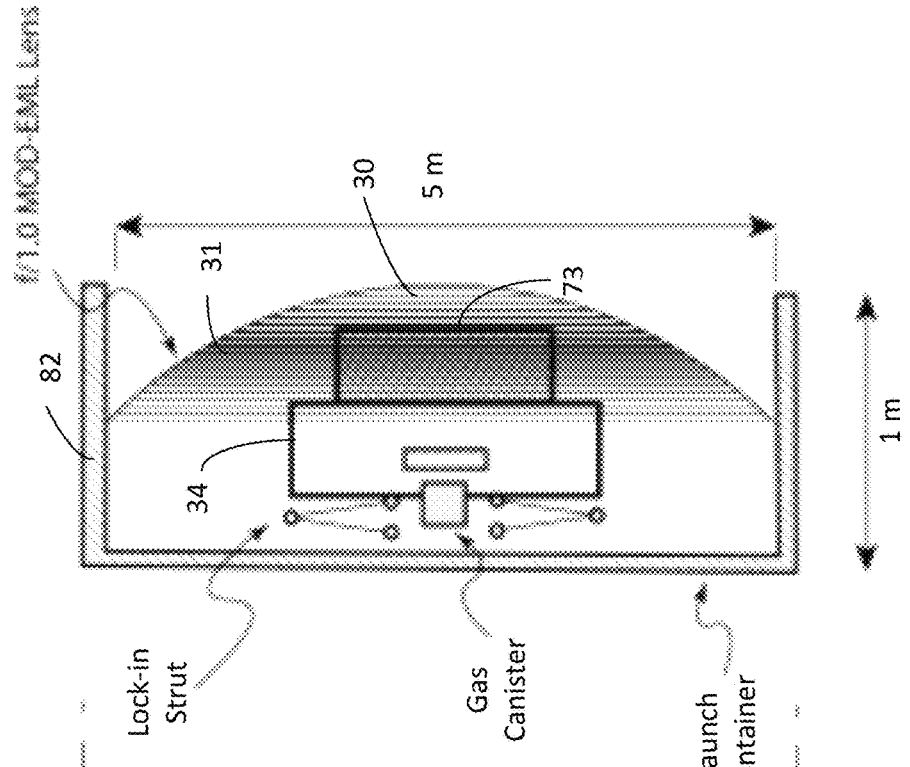
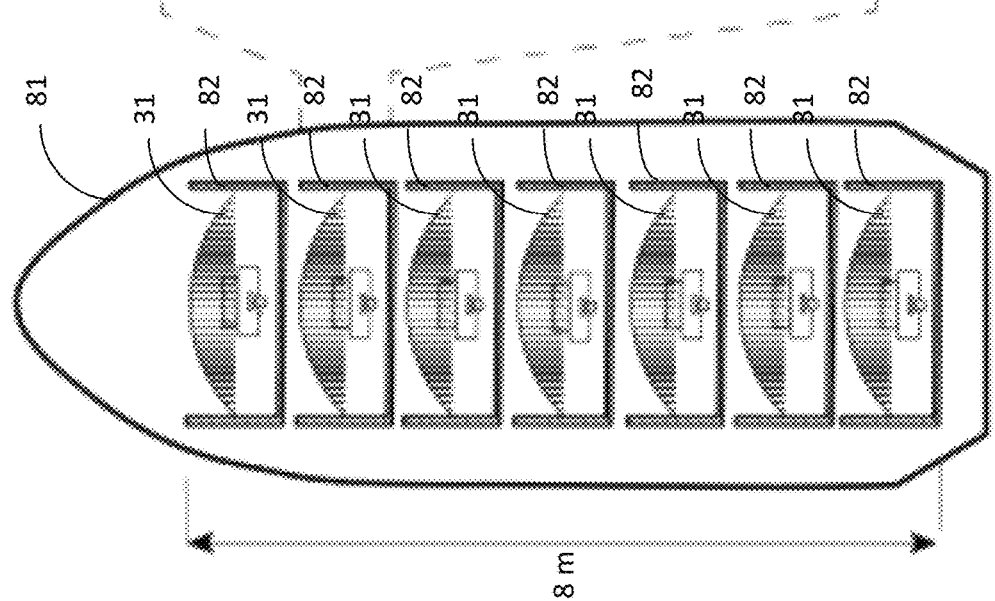
FIG. 9B
FIG. 9A

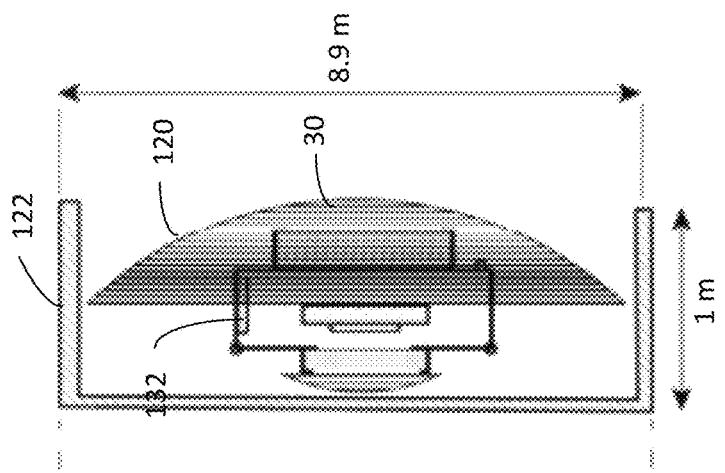
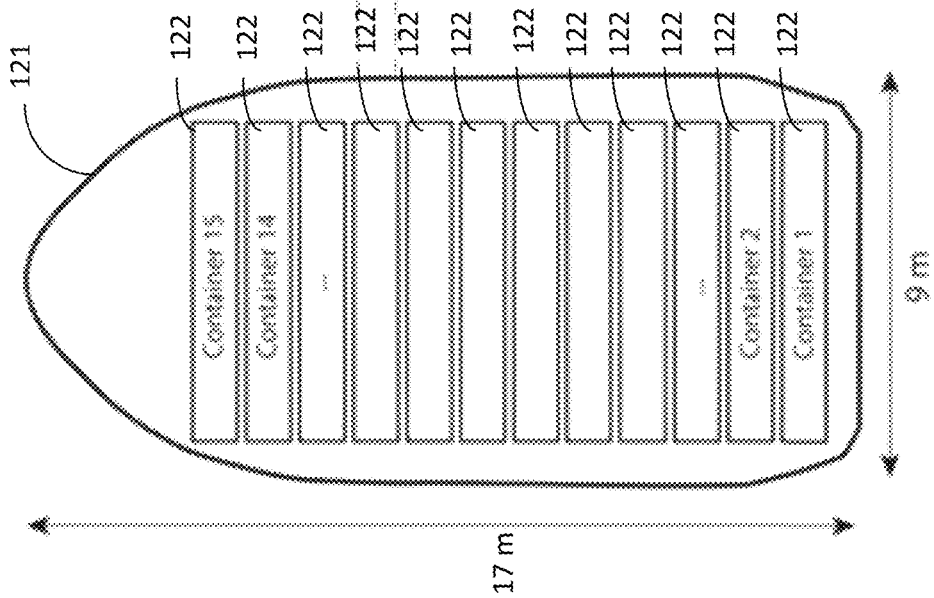
FIG. 10B
FIG. 10A

MULTI-ORDER DIFFRACTIVE FRESNEL LENS (MOD-DFL) AND SYSTEMS THAT INCORPORATE THE MOD-DFL

CROSS-REFERENCE TO RELATED APPLICATIONS

This application is a U.S. National Phase application under 35 U.S.C. § 371 of PCT international application PCT/US2019/039829 filed on Jun. 28, 2019, which claims priority to, and the benefit of the filing date of, U.S. Provisional Application having Ser. No. 62/691,892, filed on Jun. 29, 2018 and entitled "A MULTI-ORDER DIFFRACTIVE FRESNEL LENS (MOD-DFL) AND SYSTEMS THAT INCORPORATE THE MOD-DFL," both of which are incorporated by reference herein in their entireties.

TECHNICAL FIELD

The application relates to telescopes, and more particularly, the multi-order diffractive Fresnel lens (MOD-DFL) for use in telescopes.

BACKGROUND

One of the pivotal questions of modern science is whether life is common in the Universe. Answering this question will most likely require measuring the occurrence rate of habitable planets, understanding their diversity, sampling their atmospheres, and determining whether the observed atmospheric compositions can be explained without biological activity. Although the characterization of exo-earths is a key science goal of next-generation telescopes (The LUVOIR Team 2018; Gaudi et al. 2018; The OST mission concept study team 2018), due to the challenging nature of the observations, most proposed telescope concepts may not be able to accomplish this goal on target samples large enough to allow statistical exploration in a multi-dimensional parameter space. A challenge central to these observations is the intrinsic faintness of exoplanets, which is further complicated by the close angular proximity of their bright host stars (planet/star contrast).

One of the most fundamental properties of telescopes, and a limiting factor for many studies of faint extra-solar planets, is light-collecting area. For over a century following the commissioning of the 1.02-meter (m) diameter Yerkes observatory refractor, every large telescope built used a primary mirror to collect light, but large mirrors (D>2.5 m) remained very difficult and expensive to fabricate, align, and operate. While initially refracting and reflecting telescopes had been both utilized, reflectors proved to be scalable in size beyond refractors. Eventually, however, both refractors and reflectors reached the diameter beyond which their primary light-collecting elements (lenses and mirrors) became too heavy to maintain their figures. While functional refractors never exceeded 1.1 m in diameter, functional monolithic mirrors could be built as large as 5 m. Manufacturing large-diameter (D) mirrors with very high optical quality capable of working at optical wavelengths ($\lambda$) (D>6 m and $\lambda$=0.5 μm) has been a technological challenge.

For ground-based telescopes, after a four decade gap, the advent of segmented mirrors and ultralight (honeycomb) mirrors with computer-controlled surfaces enabled larger apertures to be achieved. These technologies also enabled the next generation of telescopes (Extremely Large Telescopes (ELTs)) with effective diameters between 24.5 m and 39.3 m. It is unclear whether the same technology could be utilized to build 100 m-class ground-based telescopes.

In space, monolithic mirrors have been used for the largest visual/near-infrared astronomical telescopes, with the Hubble Space Telescope's (HST's) 2.4-m diameter mirror being the largest such element. The James Webb Space Telescope (D~6.5 m) and some future concepts such as the Large UV/Optical/IR Surveyor (LUVOIR) envision building on this heritage, but utilizing segmented and actively controlled mirrors.

While further slow, gradual increases in the diameter of segmented mirrors is possible, mirrors arguably remain the single most important bottleneck in astronomical telescopes. With the slow growth of aperture sizes, obvious next steps in astrophysics remain beyond reach: for example, the study of the diversity of Earth-like planets and assessing the frequency of atmospheric biosignatures in large samples (N~1,000) of Earth-like planets remains beyond the reach of the telescopes envisioned even for the next forty years.

With over 4,000 exoplanets known, many of which may be similar to Earth, the systematic characterization of exo-earths and the search for atmospheric biosignatures is emerging as one of the highest-level science goals of modern astrophysics. With no prior knowledge on the probability of the emergence of life on other planets, the characterization of a very large number of potential earth-analogs is desirable to ensure statistically meaningful results.

In order to determine the occurrence rate of life in the galaxy, spectrometers are used to measure the atmospheric abundances of molecules such as $H_2O$, $O_2$, $O_3$, and $CO_2$ in the atmospheres of transiting habitable zone earth-like exoplanets around sun-like stars. Studying a large number of transiting earth-like planets involves observing relatively distant stars (G and K-type stars up to 200 parsec (pc) from Earth, considering the number densities of G and K-type stars and geometric probabilities of habitable zone planet transits; and M-type stars up to 60 pc, with the same considerations). The spectral feature depths for key absorbers in Earth twins are about 1 part per million (ppm). A confident (>10$\sigma$) detection of $H_2O$, $O_2$, $O_3$ for a target 200 pc away requires a light-collecting area equivalent to that of a telescope having a diameter of at least 50 m, which is about 400 times greater in collecting area than that of the largest mirror flown in space. Even assuming current state-of-the-art technology can be used to construct such a telescope, the size and weight of its components would likely make it prohibitively costly to transport them into space.

A need exists for a light-weight telescope having a light-collecting area that is sufficiently large to enable the telescope to be used to study transiting earth-like planets of distant stars.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 9A shows a payload of a spacecraft having seven folded, non-inflated balloons installed in respective launch containers prior to deployment.

FIG. 9B shows a side transparency view of one of the launch containers shown in FIG. 9A having a folded, non-inflated balloon installed therein.

FIG. 10A shows a payload of a spacecraft having fifteen folded, non-inflated balloons installed in respective launch containers prior to deployment.

FIG. 10B shows a side transparency view of one of the launch containers shown in FIG. 10A having a folded, non-inflated balloon installed therein.

DETAILED DESCRIPTION

Figure 1B:
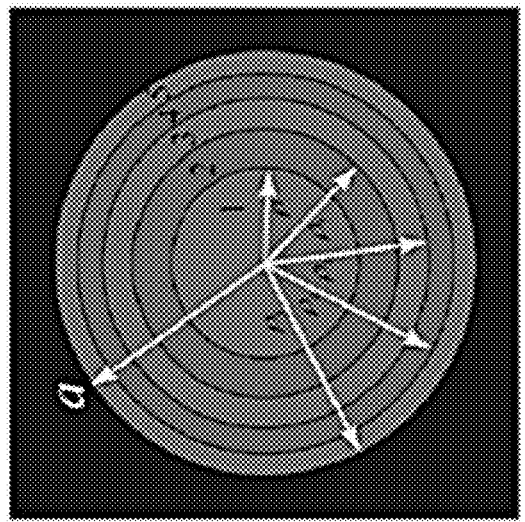
FIGS. 1A and 1B are diagrams illustrating the manner in which diffractive optical elements perform lens-like functions in accordance with the principles of interference.

The present disclosure is directed to a multi-order diffractive Fresnel lens (MOD-DFL). The MOD-DFL may be used in a space telescope for studying transiting earth-like planets of distant stars (e.g., G and K-type stars up to 200 pc from Earth, and M-type stars up to 60 pc from Earth). The MOD-DFL may comprise a MOD-DFL array comprising plurality of MOD-DFL segments that are secured to a mounting surface of a deployment device, such as a balloon, for example, in a preselected arrangement to form the MOD-DFL. An array telescope may be formed of an array of the deployment devices, such as an array of balloons, for example, each having at least one MOD-DFL secured to a mounting surface of the respective deployment device. An optics system and a camera are disposed inside of each deployment device.

A few representative embodiments of the optical device and of the system and method for making the optical device will now be described with reference to FIGS. 1-10C. It should be noted that the inventive principles and concepts are not limited to the representative embodiments described herein, as will be understood by those of skill in the art in view of the description provided herein.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art. Relative terms, such as "over," "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

Relative terms may be used to describe the various elements' relationships to one another, as illustrated in the accompanying drawings. These relative terms are intended to encompass different orientations of the device and/or elements in addition to the orientation depicted in the drawings.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor" or "processing device," as those terms are used herein encompass an electronic component that is able to execute a computer program or executable computer instructions. References herein to a system comprising "a processor" or "a processing device" should be interpreted as a system having one or more processors or processing cores. The processor may for instance be a multi-core processor. A processor may also refer to a collection of processors within a single computer system or distributed amongst multiple computer systems. The term "computer," as that term is used herein, should be interpreted as possibly referring to a single computer or computing device or to a collection or network of computers or computing devices, each comprising a processor or processors. Instructions of a computer program can be performed by a single computer or processor or by multiple processors that may be within the same computer or that may be distributed across multiple computers.

Figure 1A:
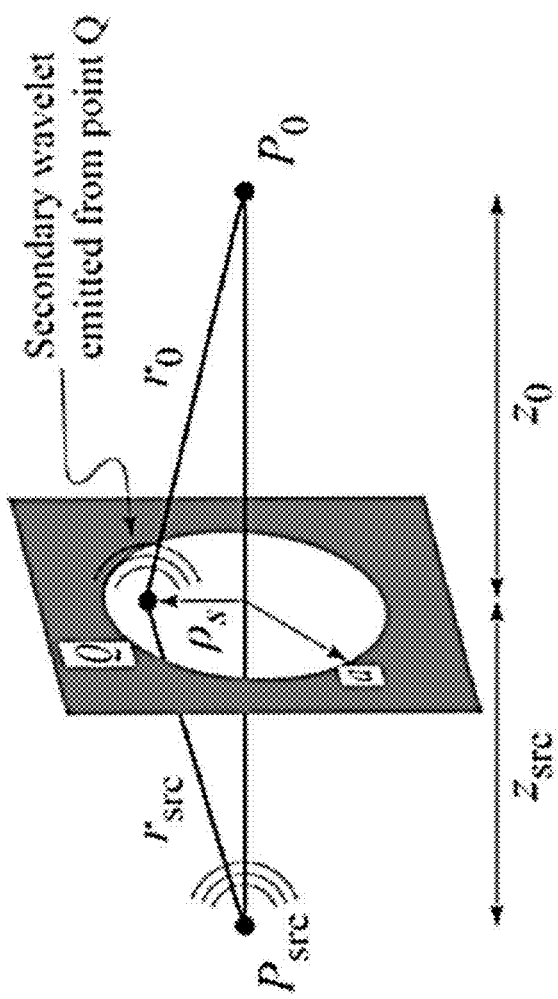

FIGS. 1A and 1B are diagrams illustrating the manner in which diffractive optical elements perform lens-like functions in accordance with the principles of interference. Diffractive optical elements perform lens-like functions that can be analyzed using the principles of interference. For example, light transmitted through an aperture with radius a that is illuminated by point source $P_{src}$ is conceptually illustrated in FIG. 1A. The aperture can be divided into equal-area Fresnel zones that identify which parts of the transmitted light interfere constructively at the observation point Po and which parts interfere destructively, as shown in FIG. 1B, based on the optical path difference (OPD) through point Q of $(r_{src}+r_0)-(z_{src}+z_0)$. Boundaries of the Fresnel zones are defined by an increase of $\lambda/2$ in OPD between successive zones. In this example, the first and second Fresnel zones produce a net zero light amplitude at the observation point, because light from an even-numbered zone combines destructively with light from an odd-numbered zone due to the $\lambda/2$ OPD between them. Likewise, light from the third and fourth zones combine destructively, leaving only light from the fifth zone to produce non-zero light amplitude at the observation point.

The well-known Fresnel zone plate (FZP) operates by blocking only the even or odd zones in the aperture, thus producing only constructive wave combination at the observation point. By extending this argument to off-axis illumination, it is understood that the FZP acts as a lens with a focus spot size that is equivalent to a classical lens of the same diameter and focal length. However, due to the fact that other focal positions can be identified along the axis, the classical FZP results in high intensity background levels at the primary focus. In addition, since the constructive or destructive nature of the wave combination depends on wavelength, the focal point changes chromatically with a focal length proportional to $1/\lambda$. That is, as wavelength increases FZP focal length decreases, which is opposite the sense of a classical refractive lens. The combination of a properly designed FZP on a refractive singlet leads to compensating focal dispersions, which results in an achromatic singlet (Stone & George 1988).

Figure 2:
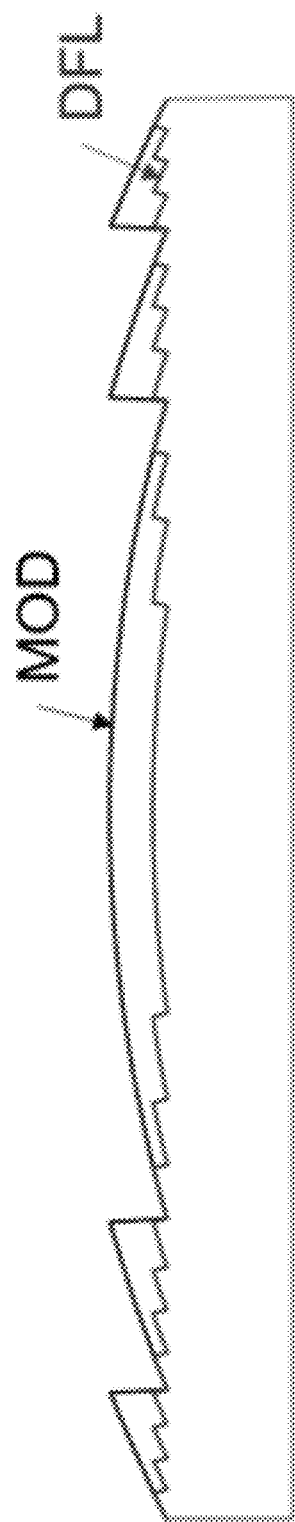
FIG. 2 is a side cross-sectional view of overlapped MOD and DFL profiles.
Figure 3:
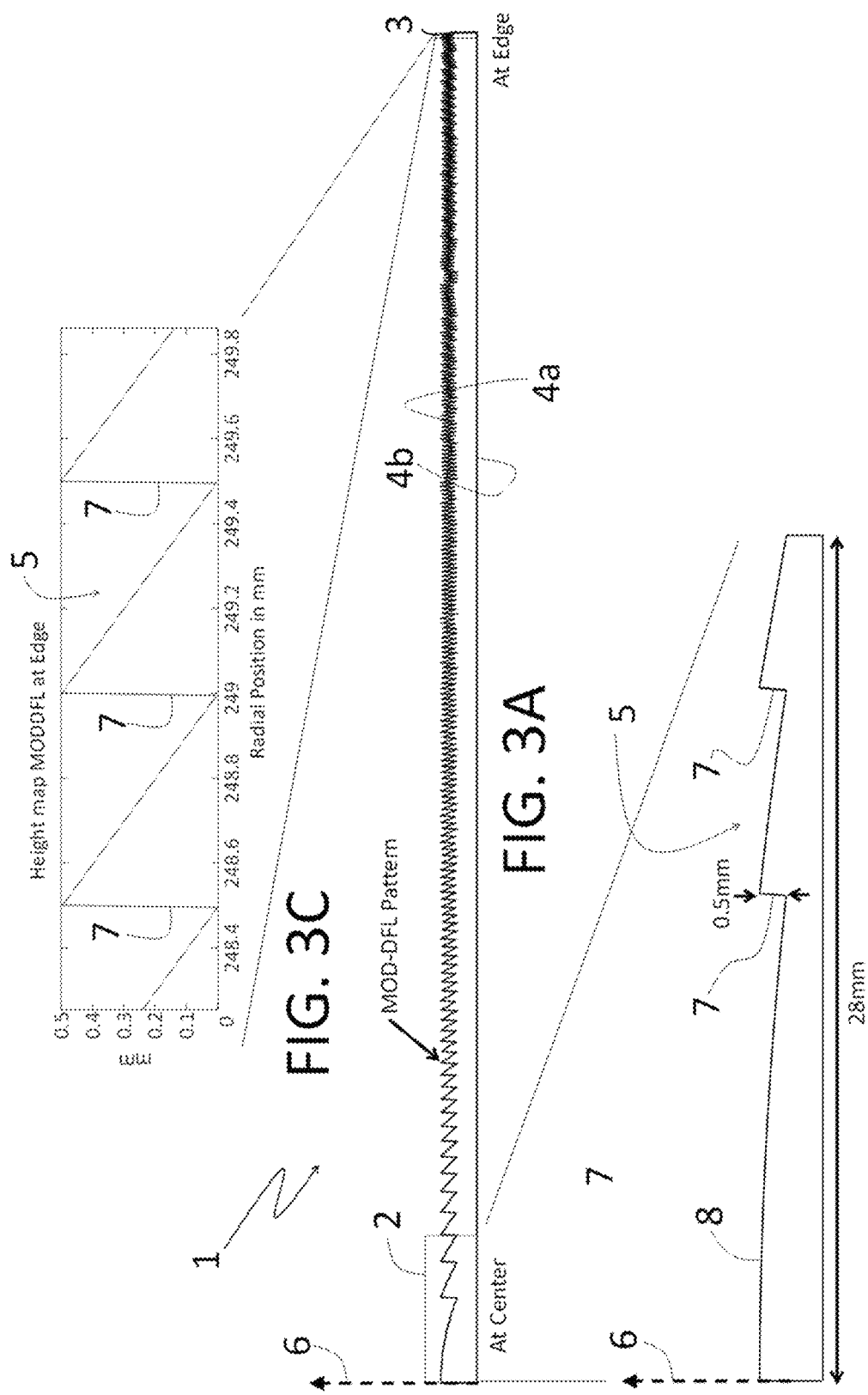
FIG. 3A is a side cross-sectional view of the MOD-DFL in accordance with a representative embodiment from a center axis of the MOD-DFL to an outer edge of the MOD-DFL.
FIG. 3B is a side cross-sectional view of the portion of the MOD-DFL contained in the box 2 shown in FIG. 3A.
FIG. 3C is a side cross-sectional view of the portion of the MOD-DFL contained in the box 3 shown in FIG. 3A.

In accordance with the present disclosure, the diffraction efficiency of light into the desired primary focal order is increased by replacing the FZP with a diffractive Fresnel Lens (DFL). The opaque-zone FZP is replaced by a transmissive phase pattern that changes OPD as a function of radius. Neighboring zones are combined into a single quadratic phase surface, as shown in FIG. 2, which shows profiles of a diffractive Fresnel lens (DFL) and a multiple-order diffraction (MOD) lens overlapped. The MOD lens is M times thicker and its zones are M times wider than the corresponding DFL. In this figure, M=4. The profile in each zone pair has a maximum of one wavelength of OPD across it. Although the DFL has the same chromatic dispersion properties as a FZP, the diffraction efficiency into the desired focal order is much greater. In fact, under ideal conditions, all of the light is focused into the primary order. Since the step height to achieve one wave of OPD at the transitions is very small (about 1 micron for visible light), the DFL is an extremely thin, planar optical element.

A MOD lens was developed by Faklis & Morris in 1995 that decreases chromatic focal dispersion. Instead of setting phase transitions based on a single wave of OPD, phase transitions are defined based on integer multiples of M waves of OPD, where M is the MOD number. As shown in FIG. 2 for M=4, the MOD lens profile is thicker than the DFL by a factor of M and zone spacings are increased. However, even if M=1000, the transition step is only about 1 mm in height for a visible light design. The MOD lens operates over a set of higher diffracted orders where each order contains a wavelength of peak diffraction efficiency and each of these wavelengths come to a common focus. The MOD lens exhibits strong chromatic dispersion at intermediate wavelengths but, interestingly, the maximum focal dispersion of the MOD lens is decreased to a range of approximately f/M compared to the large range of a DFL. For example, an f=5 m focal length, M=1,000 MOD lens would have a focal range of only ±0.005 m over a wavelength range from 500 nm to 1000 nm, whereas a DFL would have a focal range of approximately ±3.0 m over the same range of wavelengths.

For a particular application, the MOD-DFL design of the present disclosure typically has the same desired first-order properties as a traditional refractive lens, such as the operating wavelengths and focal length. When designing the MOD-DFL for broadband performance, the design wavelength is chosen to be the central wavelength of the wavelength range. Transition depths may be defined based on the formula $M \times \lambda A/(n_2-n_1)$, where $n_2$ and $n_1$ are the index of refraction of the lens material and the incident index, respectively. Transition locations may be based on integer multiples of M waves of OPD for on axis rays. The individual zones can be modelled and optimized using standard lens design software.

Following optimization in lens design software, the MOD-DFL design is typically verified using a physical optics simulation to confirm the diffractive performance. Optical path length may be determined at the exit pupil reference sphere using ray tracing. A Hankel transform calculation may be used to determine field values at a sampled image plane. The magnitude squared of these field values provides the irradiance, which represents the point spread function of the lens. This simulation may be performed over a finely sampled spectrum of the full bandwidth as well as for a range of image planes to account for both refractive and diffractive chromatic dispersion.

The mass of a conventional (refractive) lens can be described as a planoconvex lens (sphere cap) as:

$$M_{lens} = \rho \frac{1}{6}\pi h(3R^2+h^2), \quad (1)$$

where $\rho$ is the density of the glass, h is the height of the lens, and R is the radius of the lens. In contrast, the mass of a MOD-DFL (of order M) designed for a center wavelength $\lambda_c$ is simply:

$$M\text{mode} = \varphi \rho (R^2 \pi)(M\lambda c), \quad (2)$$

where $\varphi$ is the volume-filling factor of the MOD-DFL close to 0.5. The mass ratio of a refractive lens to a MOD-DFL can be expressed as:

$$M_{lens}/M_{MOD-DFL}=h(3R2+h2)6\varphi R2M\lambda c \quad (3)$$

For cases of relatively thin lenses (h<R), this ratio can be approximated to the first order by:

$$M_{lens}/M_{MOD-DFL}\approx h/M\lambda_c. \quad (4)$$

For example, for a lens with a radius of 5 m and a relative thickness of h/R=0.1, an M=1,000, the MOD-DFL optimized for $\lambda_c$=600 nm would provide about two orders of magnitude of mass reduction. The mass reduction that can be achieved by replacing a thick lens with a MOD-DFL would be even greater. In short, MOD-DFLs represent at least two orders of magnitude lower mass for a given lens diameter, a transformative advantage for space telescopes.

The MOD-DFL described below is well-suited for, but not limited to, applications in which a large light-collecting area is needed, such as astrophysical applications. FIG. 3A is a side cross-sectional view of the MOD-DFL 1 in accordance with a representative embodiment from a center axis 6 of the MOD-DFL 1 to an outer edge of the MOD-DFL 1. FIG. 3B is a side cross-sectional view of the portion of the MOD-DFL 1 contained in the box 2 shown in FIG. 3A. FIG. 3C is a side cross-sectional view of the portion of the MOD-DFL 1 contained in the box 3 shown in FIG. 3A. An optical substrate 4 of the MOD-DFL 1 has a top surface 4a and a bottom surface 4b. A surface profile 5, visible in FIGS. 3B and 3C, is formed in the top surface 4a and is radially symmetric relative to a center axis 6 of the MOD DFL 1. The surface profile 5 comprises N transitions 7 in the top surface 4a at N radial positions, respectively, from the center axis 6, where N is a positive integer that is greater than or equal to 2. Each of the transitions 7 occurs at a respective zone boundary and has a step height in a direction substantially parallel to the center axis 6.

In accordance with a representative embodiment, the surface profile 5 is a continuous curve 8 (FIG. 3B) from the center axis 6 to a closest of the N transitions 7 to the center axis 6. As will be described below in more detail with reference to FIG. 4, in accordance with a representative embodiment, the MOD-DFL 1 is curved, i.e., the surface profile 5 is formed on a curved surface to reduce comatic aberration and improve performance. In accordance with a representative embodiment, the portion of the surface profile 5 that is the continuous curve 8 is aspherical in shape. The thickness of the MOD-DFL 1, as measured between surfaces 4a and 4b, is many times smaller than the radial distance from the center axis 6 to the outer edge of the MOD-DFL 1, so as to make a lightweight lens structure.

In order for the MOD-DFL 1 to be suitable for use in measuring wavelengths corresponding to the presence of molecules such as $H_2O$, $O_2$, $O_3$, and $CO_2$ in the atmospheres of transiting habitable zone earth-like exoplanets around other stars, the MOD-DFL 1 typically has an order, M, that is greater than or equal to 250 and the transitions 7 have a step height that is greater than or equal to 0.25 millimeters (mm). In some embodiments, the step height is greater than or equal to 0.50 mm. It has been found through experimentation and testing that an order of M=324 reduces axial focal shift and reduces the wavelength range over which defocus may occur to 1.5 nanometers (nm).

Adjacent transitions 7 are separated by a distance, d, that changes with distance from the center axis 6. In accordance with a representative embodiment, the transitions 7 near the outer edge of the MOD-DFL 1, as depicted in FIG. 3C, are separated from one another by smaller radial distances than transitions near the center axis 6, as depicted in FIG. 3B. For example, in the representative embodiment shown in FIGS. 3A-3C, the distance from the center axis 6 out to the third transition from the center axis 6 is about 28 mm, whereas the distance, d, between adjacent transitions 7 at the outer edge of the MOD-DFL 1 is only about 0.5 mm. It should be noted, however, that the MOD-DFL 1 is not limited with respect to the locations at which the transitions 7 occur, the step height, the distance between adjacent transitions 7, or the radius of the MOD-DFL 1, as these parameters are preselected based on a number of factors, as will be understood by those of skill in the art in view of the description provided herein.

The MOD-DFL 1 may be made by different processes including, for example, photolithography, diamond turning, molding, and epoxy replication. In order to make the MOD-DFL 1 with a desired precision, the manufacturing process typically includes using diamond turning to make a mold master and using the mold master to form a MOD-DFL replicate out of an optical material, such as an optical epoxy or polymer.

Figure 4:
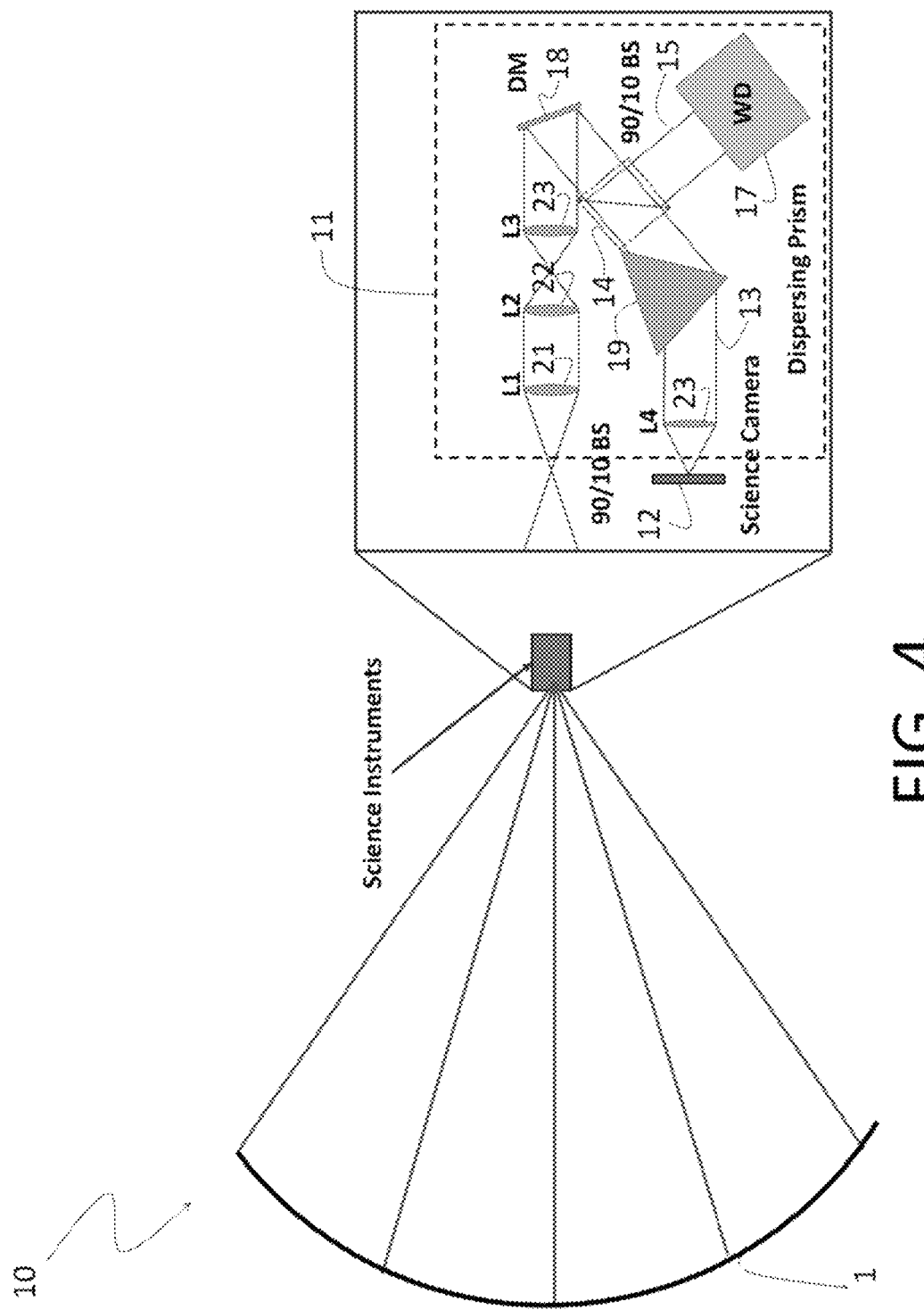
FIG. 4 is a block diagram of a spectroscopy system in accordance with a representative embodiment that incorporates the MOD-DFL and that also includes an optics system and a camera.
Figure 5:
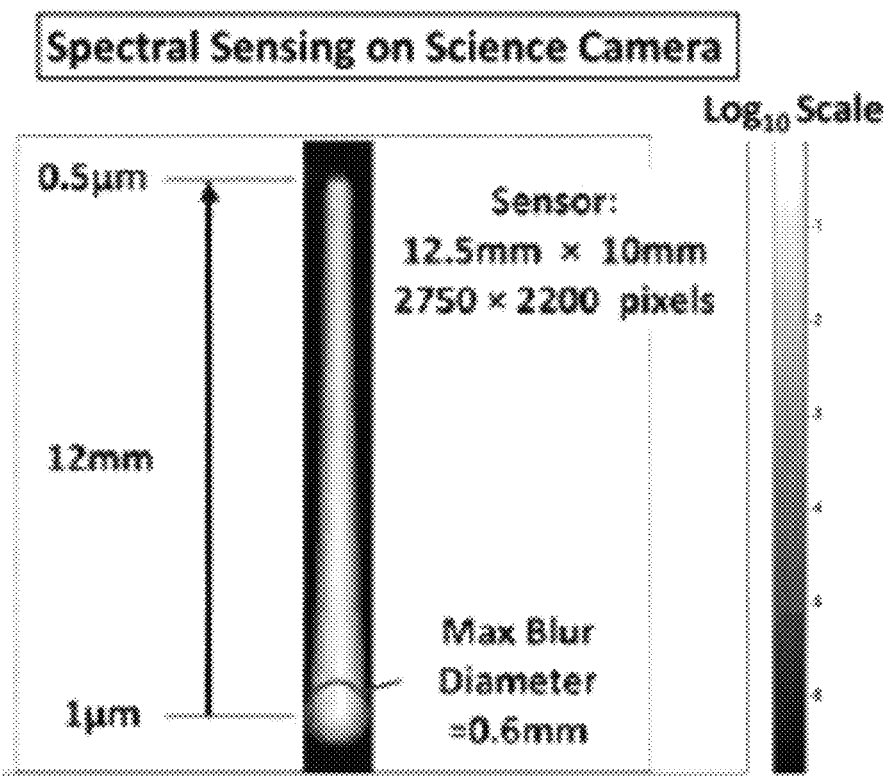
FIG. 5 is a simulated log scale image of the dispersed spectrum measured by the camera shown in FIG. 4 with a uniform incident power spectrum.

FIG. 4 is a block diagram of a spectroscopy system 10 in accordance with a representative embodiment that incorporates the MOD-DFL 1 and that also includes an optics system 11 and a camera 12. FIG. 5 is a simulated log scale image of the dispersed spectrum measured by the camera 12 with a uniform incident power spectrum. As will be described below in more detail with reference to FIGS. 9A-10C, multiple instances of the spectroscopy system 10 can be deployed in space on respective deployment devices, such as inflatable balloons, for example, to form an array telescope having a very large light-collecting area.

The camera 12 may be, for example, a K694-CL Kingfisher 6MP science camera manufactured by Raptor Photonics. Atmospheric models show that while the presence of molecular oxygen alone in an atmosphere may be explained with a variety of abiotic processes, the simultaneous presence of molecular oxygen and water are a powerful signature of biological activity in Earth-like planets. Considering the peak wavelength of the stellar emission (which is modulated by the transit signal), the strengths of the atmospheric features of common absorbers ($H_2O$, $O_2$, $O_3$, and $CO_2$), and their spectral overlap, it was determined by the inventors that focusing on a 0.5 to 1.0 micrometer (micron) wavelength band was sufficient, as shown in FIG. 5. In other applications, other wavelength bands may be of interest, in which cases the MOD-DFL 1, the optics system 11 and the camera 12 will be chosen or designed for such applications. In some cases, a wider wavelength band of 0.5 to 2.0 microns may be measured by the system 10.

The optics system 11 receives light of one or more preselected wavelengths coupled onto the optics system 11 by the MOD-DFL 1 and directs at least a portion of the received light onto a first optical pathway 13. The camera 12 is disposed along the first optical pathway 13 and receives light directed onto the first optical pathway 13 by the optics system 11. The camera 12 generates one or more images containing spectral information about the light received thereby, such as the spectral information shown in FIG. 5. In accordance with a representative embodiment, the optics system 11 includes a beam splitter 14. The beam splitter 14 directs a first portion of the received light toward the first optical pathway 13 and directs a second portion of the received light onto a second optical pathway 15. In accordance with this embodiment, the beam splitter 14 is a 90/10 beam splitter that directs 90% of the light toward the first optical pathway 13 and 10% of the light onto the second optical pathway 15.

In accordance with a representative embodiment, the spectroscopy system 10 includes a wavefront diagnostics (WD) instrument 17 disposed along the second optical pathway 15 and a deformable mirror 18. The WD instrument 17 receives the second portion of the received light from the beam splitter 14 and controls the deformable mirror 18 to perform image deformity correction. In accordance with a representative embodiment, the optics system 11 also includes one or more lenses, L1 21, L2 22 and L3 23, that receive the light coupled onto the optics system 11 by the MOD-DFL 1 and direct the light in a first direction toward the deformable mirror 18. The deformable mirror 18 receives light from the lenses 21-23 and directs the received light toward the beam splitter 14. A dispersing optical element (e.g., a dispersing prism) 19 separates the received light along optical pathway 13 into a spectrum of angles according to the wavelengths contained in the spectrum. This angular distribution is then focused by lens L4 23 onto the camera 12 to perform the spectral sensing depicted in FIG. 5.

Figure 6A:
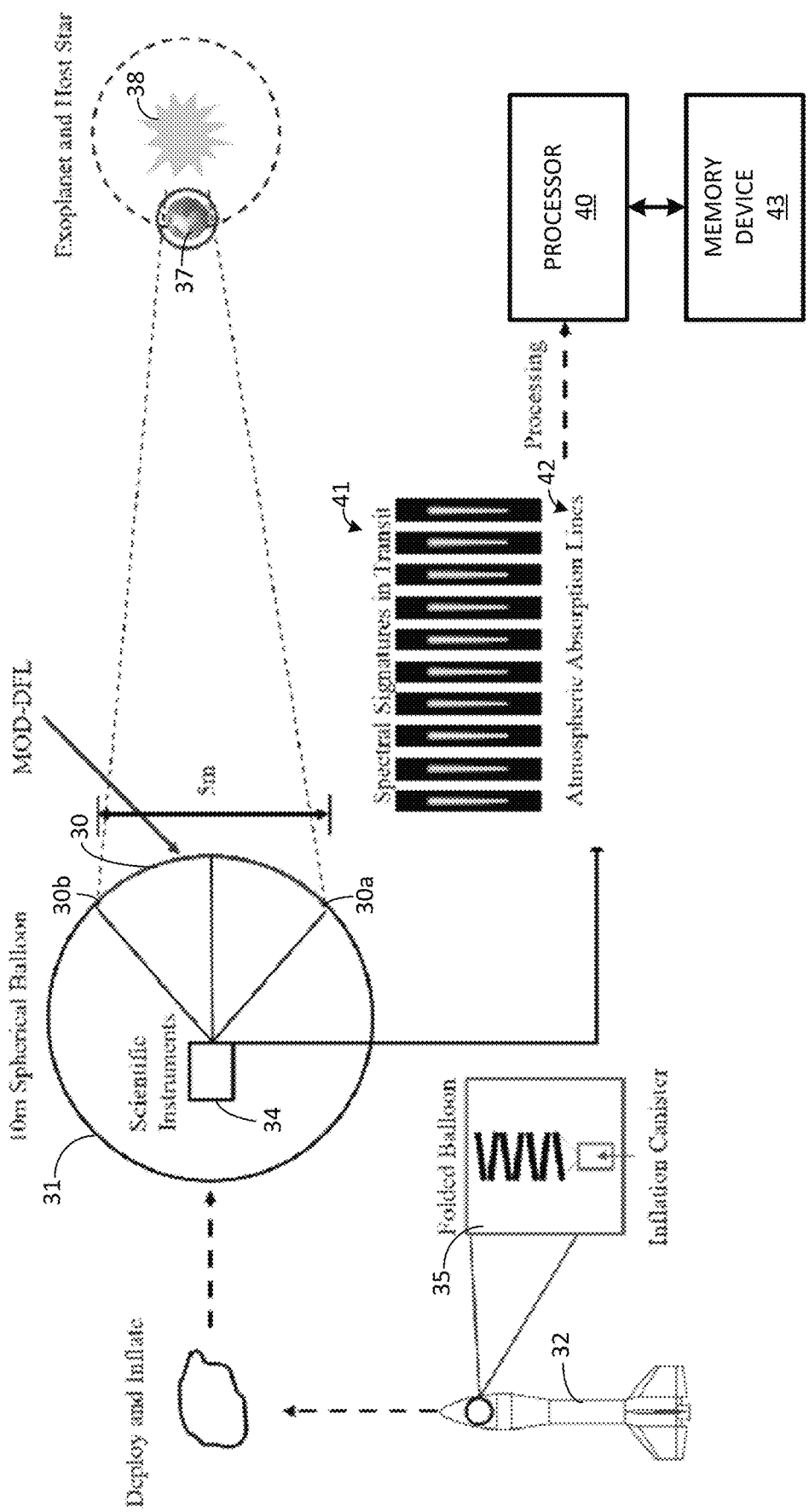
FIGS. 6A and 6B together pictorially depict transporting a deployment device 31 comprising a telescope into space, deploying the deployment device 31 and processing images captured by the telescope to obtain exo-planet transit data.
Figure 6B:
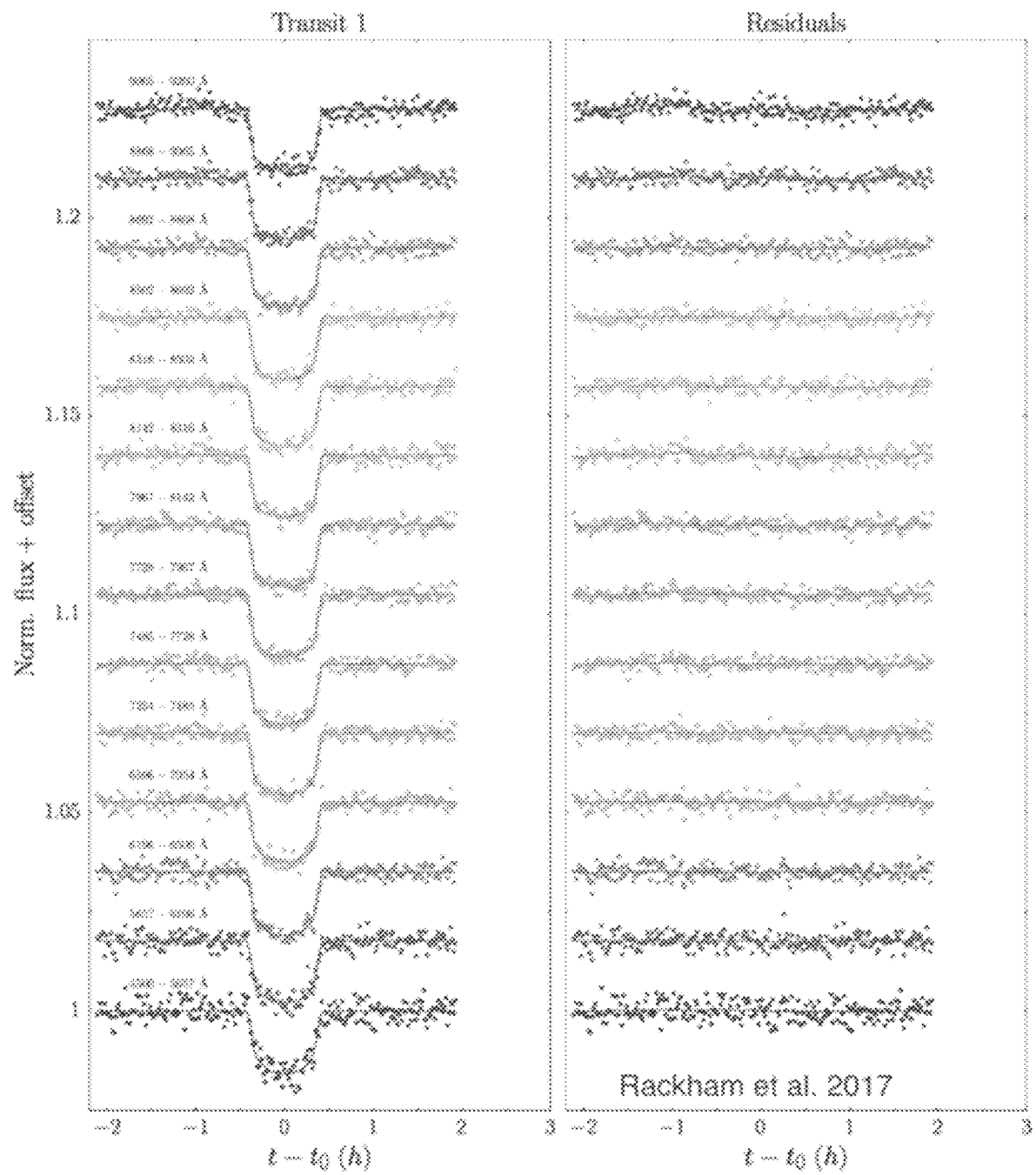

FIGS. 6A and 6B together pictorially depict transporting a deployment device 31 comprising a telescope into space, deploying the deployment device 31 and processing images captured by the telescope to obtain exo-planet transit data. A segmented MOD-DFL 30 is disposed on a mounting surface 33 of a deployment device 31, which in this embodiment is an inflatable balloon. In accordance with this representative embodiment, the balloon 31 is carried into space in its non-inflated state as a payload of a spacecraft 32. Once the spacecraft 32 reaches a suitable orbit in space, the balloon 31 is inflated and deployed. An optics system and a camera, such as the optics system 11 and the camera 12 shown in FIG. 4, which are labelled collectively in FIG. 6A as Scientific Instruments 34, are disposed inside of the balloon 31 and operate in the manner described above with reference to FIGS. 4 and 5.

In accordance with this representative embodiment, the balloon 31 is in a folded, non-inflated state inside of the spacecraft 32 prior to deployment. The spacecraft 32 has an inflation canister 35 that inflates the balloon 31 to deploy it. Once the balloon 31 has been inflated and deployed, the segmented MOD-DFL 30 reassembles itself to have the surface profile 5 described above with reference to FIGS. 3A-3C. As shown in FIG. 6A, the segmented MOD-DFL 30 is disposed on the curved surface of the balloon 31. As indicated above, placing the MOD-DFL 30 having the surface profile 5 on a curved surface reduces or eliminates comatic aberration.

In accordance with this representative embodiment, the balloon 31 is a spherical balloon having a diameter of 10 meters (m) and the linear distance from one end 30a to the opposite end 30b of the segmented MOD-DFL 30 is 5 m. Thus, in accordance with this representative embodiment, the segmented MOD-DFL 30 has a light-collecting area that is greater than or equal to 5 m, depending on the other dimensions of the segmented MOD-DFL 30.

A processor 40 is configured to process the spectral signatures 41 output from the Scientific Instruments 34 to produce atmospheric absorption lines 42 that provide the spectral information that can be used to determine abundances of molecules such as $H_2O$, $O_2$, $O_3$, and $CO_2$ in the atmosphere of the transiting earth-like planet 37, as shown in FIG. 6B. The software and/or firmware that is executed by the processor 40 is stored in a memory device 43. The memory device 43 may be on-board memory of the processor 40 or a separate memory device that is accessible by the processor 40, as depicted in FIG. 6A.

Figure 7:
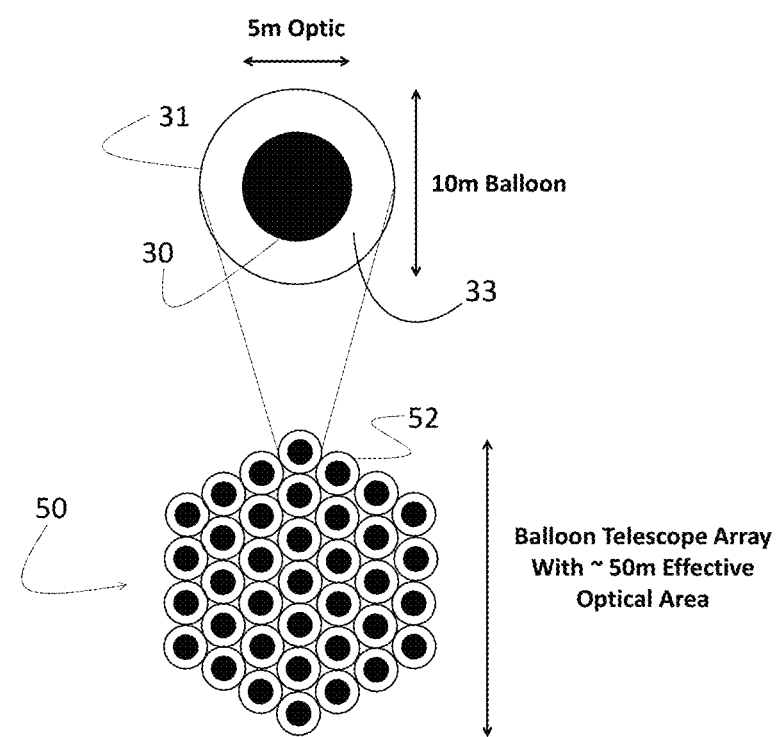
FIG. 7 illustrates a pictorial plan view of a balloon array that may be used as a deployment device in accordance with a representative embodiment.

FIG. 7 illustrates a pictorial plan view of a balloon array 50 comprising a plurality of smaller balloons 52 that may be deployed as an array telescope. In accordance with this embodiment, each of the smaller balloons 52 has the same configuration as the balloon 31 shown in FIG. 6A, i.e., each balloon 52 has a segmented MOD-DFL 30, an optics system and a camera. The difference of the spectra obtained before, during, and after planetary transit reveals absorption features in the planetary atmosphere. The array of balloons 52 can measure transit depths separately, allowing the measurements to be summed (i.e., measurement does not require the combination of coherent light). The array of balloons 52 provides a light-collecting area equivalent to that of a telescope having a 50 m diameter, which is about 400 times greater (in light-collecting area) than that of the largest mirror flown in space. Such a large light-collecting area is well suited for studying a transiting earth-like planet 37 of a distant star 38 (e.g., a G or K-type star up to 200 pc from Earth, and M-type stars up to 60 pc from Earth).

Figures 8A, 8B:
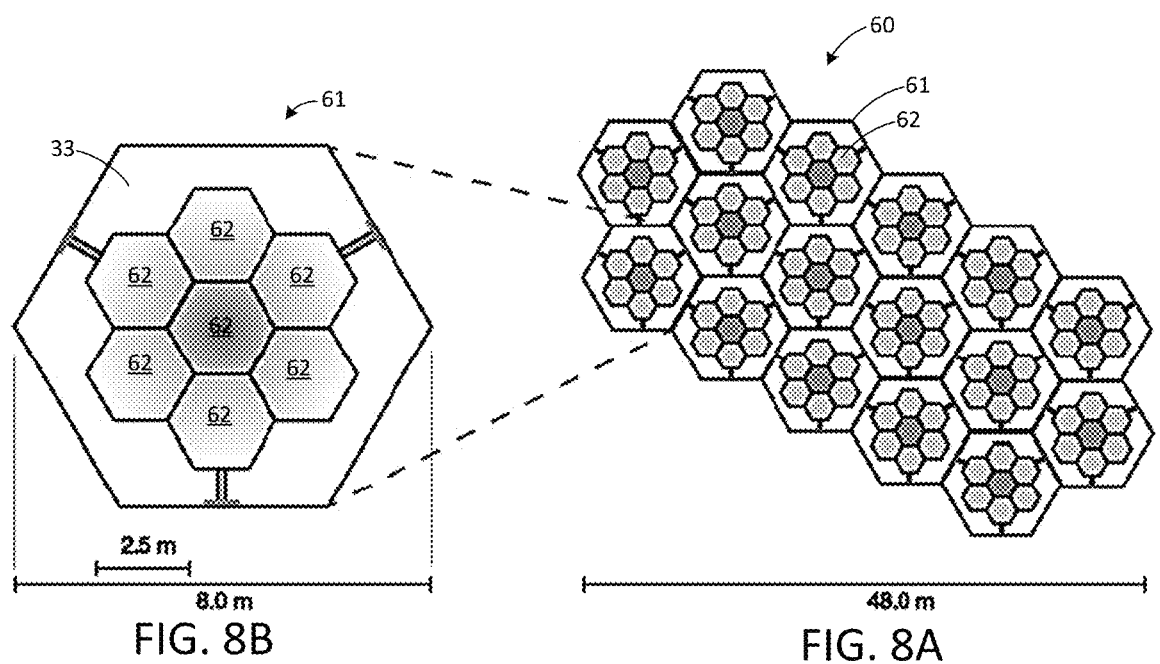
FIG. 8A is a plan view of a MOD-DFL array that may be used to form the MOD-DFL shown in FIGS. 6A and 7 in accordance with a representative embodiment.
FIG. 8B is a plan view of one of the MOD-DFLs of the MOD-DFL array shown in FIG. 8A.

FIG. 8A is a plan view of a MOD-DFL segment array 60 that may be used to form the MOD-DFL 30 shown in FIGS. 6A and 7 in accordance with a representative embodiment. FIG. 8B is a plan view of one of the MOD-DFLs 61 of the MOD-DFL array 60 shown in FIG. 8A. The MOD-DFL 61 comprises a plurality of MOD-DFL segments 62 secured to a mounting surface 33 of the deployment device in a preselected arrangement to form the MOD-DFL 61. Each MOD-DFL segment 62 comprises a segment optical substrate having a bottom surface that is attached to the mounting surface 33 of the deployment device (e.g., the balloon) and a segment surface profile formed in the top surface. The preselected arrangement shown in FIG. 8A of the plurality of MOD-DFLs 61 forms a MOD-DFL surface profile having the profile 5 shown in FIGS. 3A-3C that is symmetric relative to a center axis of the MOD DFL array 60. Thus, the MOD-DFL segments 62 combine together to form the MOD-DFL surface profile 5 shown in FIGS. 3A-3C having N transitions at N radial positions, respectively, from the center axis of the MOD-DFL surface profile 5, where N is a positive integer that is greater than or equal to 2.

In the representative embodiment shown in FIGS. 8A and 8B, each MOD-DFL 61 is hexagonal in shape and has a group of seven hexagonally-shaped MOD-DFL segments 62 that are arranged as shown in FIGS. 8A and 8B such that multiple sides of each hexagonally-shaped MOD DFL segment 62 are in contact with respective sides of multiple other hexagonally-shaped MOD-DFL segments 62 of the same MOD-DFL 61. In other words, the MOD-DFL segments 62 are located in a large, light-weight honeycomb-like grid. In accordance with this representative embodiment, the center hexagonally-shaped MOD-DFL segment 62 of each MOD-DFL 61 is an on-axis optical element and the other hexagonally-shaped MOD-DFL segments 62 of the MOD-DFL 61 are off-axis optical elements. The hexagonal shape of each MOD-DFL 61 and the hexagonal shape of each MOD-DFL segment 62 allows space to be efficiently used when using diamond turning to manufacture the master that is subsequently used to replicate the MOD-DFLs 61.

It should be noted that, in accordance with this embodiment, the hexagonally-shaped MOD-DFL segments 62 of a given one of the hexagonally-shaped MOD-DFLs 61 are coherently phased. However, the different hexagonally-shaped MOD-DFLs 61 that make up the MOD-DFL array 60 are incoherently phased. Thus, the light from the different MOD-DFLs 61 that form the array 60 can be combined incoherently, i.e., digitally co-added using a suitably-configured processor such as the processor 40 shown in FIG. 6A. It is not necessary to coherently combine light across the entire effective diameter of the array telescope because diffraction-limited performance is not needed over the entire 50-m effective diameter. It should also be noted that each MOD-DFL segment 61 has two-axis pointing and tracking capability. Each MOD-DFL 61 may be used as an individual telescope to track different targets or the MOD-DFL array 60 can be operated in a coordinated array mode to track a common target.

Figure 9C:
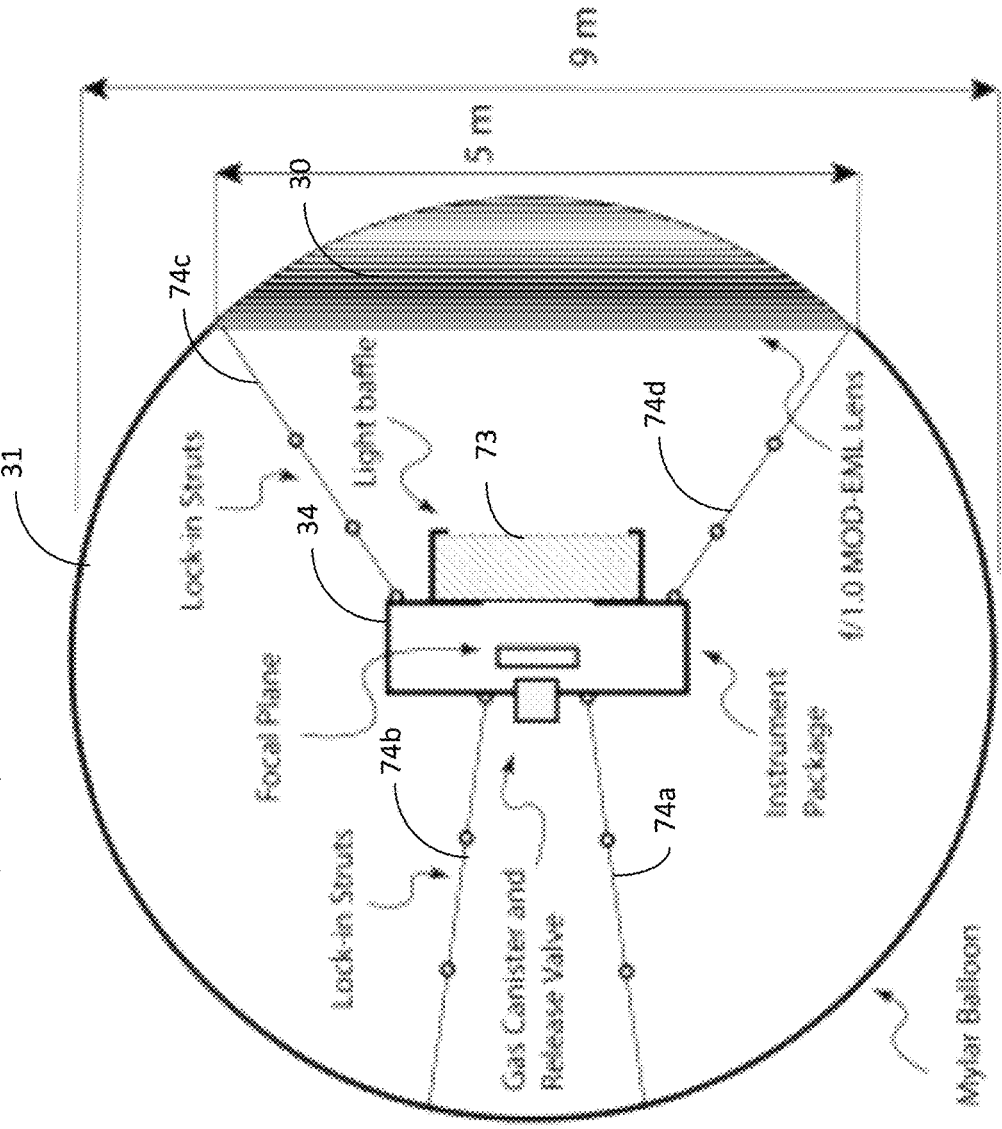
FIG. 9C shows a side view of one of the balloons shown in FIGS. 9A and 9B after it has been ejected from the launch container and inflated.

FIGS. 9A-9C depict an illustrative embodiment of the manner in which a plurality of the balloons 31 shown in FIG. 6A in their folded, non-inflated state can be carried into space in a payload of a spacecraft, inflated and launched from the spacecraft. FIG. 9A shows a payload 81 of a spacecraft having seven folded, non-inflated balloons 31 installed in respective launch containers 82 prior to deployment. FIG. 9B shows a side transparency view of one of the launch containers 82 shown in FIG. 9A having a folded non-inflated balloon 31 installed therein. FIG. 9C shows a side view of one of the balloons 31 after it has been ejected from the launch container and inflated.

As depicted in FIG. 9A, in the stowed state of the balloons 31, the launch containers 82 can be stacked to conserve space inside of the payload 81. The segmented MOD-DFL 30 is very thin and light weight, and therefore does not add significantly to the weight of the non-inflated balloon 70. As shown in FIG. 9B, the launch container 82 includes a gas canister 83 for inflating the balloon 31. Inside of the launch container 82, the balloon 31 is in a folded, non-inflated state with the Instrument Package 34 and a light baffle 73 positioned beneath the segmented MOD-DFL 30.

As depicted in FIG. 9C, first and second lock-in struts 74a and 74b, respectively, have ends that are attached to respective locations on a rear portion of the balloon 31 and to respective locations on a bottom side of the Instrument Package 34. Third and fourth lock-in struts 74c and 74d, respectively, have ends that are attached to respective locations on a front portion of the balloon 31 and to respective locations on a top side of the Instrument Package 34. When the balloon 31 is inflated, a predetermined amount of tension is placed on the first, second, third and fourth lock-in struts 74a-74d, respectively, to cause them to suspend the Instrument Package 34 at the geometric center of the balloon 31 in axial alignment with the center axis of the segmented MOD-DFL 30.

In the embodiment shown in FIGS. 9A-9C, seven of the balloons 31 are deployed, each having the configuration shown in FIG. 9C. The balloons 31 can act as individual telescopes or they can be arranged in a coordinated array to act as a single telescope having a very large light-collecting area, i.e., a light-collecting area equivalent to a telescope having a 50 m diameter.

The array of balloons 31 can operate in two modes:
1) Transit Search Mode: The balloons 31 monitor stars independently of each other, and through their parallel operation carry out the most sensitive and most comprehensive exoplanet search yet.
2) Follow-up Transit Spectroscopy Mode: During known transit events, all of the balloons 31 cooperate as a single telescope to obtain the transmission spectrum of the same planet; the signals obtained by the balloons 31 are combined non-coherently (by digitally co-adding), enabling the confident detection (>10 sigma) of major atmospheric absorbers ($O_2$, $O_3$, $H_2O$) in Earth twins up to 200 pc distance from Earth.

Because the system can be a modular system assembled from identical MOD-DFL segments, with each segment being constructed over a very small set of unique components (i.e., only two different types of optical elements, on-axis and off-axis optical elements), fabrication costs can be kept very low. In addition, the honeycomb-like structure of the MOD-DFL segments provides an excellent structural strength-to-mass ratio, although the segments are not limited to having the honeycomb-like structure. Because each MOD-DFL segment can act as an individual telescope, there is no need to precisely align the segments when securing them to the mounting surface of the balloon. It is also possible to carry the molds for the MOD-DFL segments into space in the payload of a spacecraft along with unmolded glass and then to perform the molding process out in orbit. This would allow the MOD-DFL to be made even lighter, as the segments would need to be made strong enough to survive launch stresses on the spacecraft.

In addition, the array telescope is capable of providing a light-gathering capability that exceeds current state-of-the-art (Hubble Space Telescope, 2.4-meter mirror diameter) by about 400 times, at a small fraction of the mass associated with a scaled classical reflective mirror telescope. Thus, the array telescope is capable of carrying out the first large-scale assessment of atmospheric biosignatures in the galaxy, potentially leading to profound breakthroughs in science. Furthermore, the powerful light-gathering capability combined with the flexibility to observe the same target with all unit telescopes or to survey large fields simultaneously has the potential to transform multiple modern observational astrophysics, cosmology, and planetary science.

It should be noted that while the representative embodiment of the space telescope shown in FIG. 7 depicts the balloons 52 being attached to one another in a particular arrangement, it is not necessary in all cases for the balloons to be physically attached to one another. For example, a plurality of the balloons 31 shown in FIG. 9C may be deployed in space without being physically attached to one another. The balloons 31 may even be launched separately or in multiple groups. Because the light collected by each of the balloons 31 can be combined non-coherently (i.e., measured signals digitally co-added), they may be physically disconnected units, which is preferable in some cases (e.g., the baseline science case).

Figure 10C:
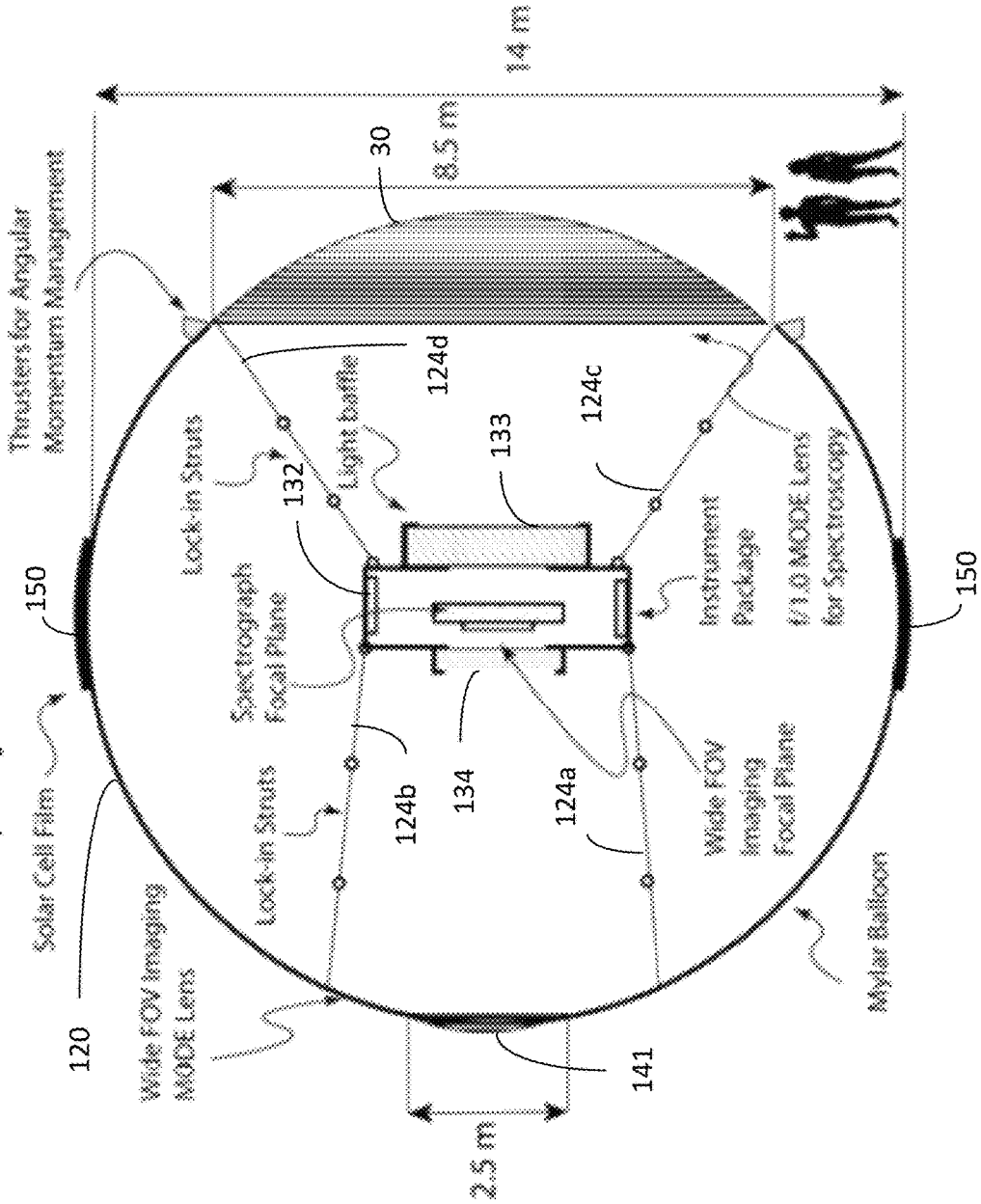
FIG. 10C shows a side view of one of the balloons shown in FIGS. 10A and 10B after it has been ejected from the launch container and inflated.

FIGS. 10A-10C depict another representative embodiment of the manner in which a plurality of the balloons 120 in their folded, non-inflated state can be carried into space in a payload of a spacecraft, inflated and launched from the spacecraft. FIG. 10A shows a payload 121 of a spacecraft having fifteen folded, non-inflated balloons 120 installed in respective launch containers 122 prior to deployment. FIG. 10B shows a side transparency view of one of the launch containers 122 shown in FIG. 10A having a folded non-inflated balloon 120 installed therein. FIG. 10C shows a side view of one of the balloons 120 after it has been ejected from the launch container and inflated.

As depicted in FIG. 10A, in the stowed state of the balloons 120, the launch containers 122 can be stacked to conserve space inside of the payload 121. As indicated above, the segmented MOD-DFL 30 is very thin and light weight, and therefore does not add significantly to the weight of the non-inflated balloon 120. The launch container 122 includes a gas canister for inflating the balloon 120. Inside of the launch container 122, the balloon 120 is in a folded, non-inflated state with an instrument package 132 and first and second light baffles 133 and 134, respectively, positioned beneath a first segmented MOD-DFL 30. In accordance with this representative embodiment, the balloon 120 has a second segmented MOD-DFL 141 disposed on a surface thereof opposite the first segment MOD-DFL 30. The first and second light baffles 133 and 134, respectively, couple light directed into them by the first and second MOD-DFLs 30 and 141, respectively, onto the instrument package 132. In accordance with this representative embodiment, the instrument package 132 has first and second cameras, or other optical sensors, that receive the light passing through the first and second light baffles 133 and 134, respectively. This configuration allows the telescope to be used simultaneously to process images of Earth or other celestial bodies and images of distant stars.

With reference to FIG. 10C, first and second lock-in struts 124a and 124b, respectively, have ends that are attached to respective locations on a rear portion of the balloon 120 and to respective locations on a bottom side of the instrument package 132. Third and fourth lock-in struts 124c and 124d, respectively, have ends that are attached to respective locations on a front portion of the balloon 120 and to respective locations on a top side of the instrument package 132. When the balloon 120 is inflated, a predetermined amount of tension is placed on the first, second, third and fourth lock-in struts 124a-124d, respectively, to cause them to suspend the instrument package 132 at the geometric center of the balloon 120 in axial alignment with the center axes of the first and second segmented MOD-DFL 30 and 141, respectively.

In the embodiment shown in FIGS. 10A-10C, fifteen balloons 120 are deployed, each having the configuration shown in FIG. 10C. The balloons 120 can act as individual telescopes or they can be arranged in a coordinated array to act as a single telescope having a very large light-collecting area. In the embodiment shown in FIGS. 10A-10C, the diameter of the first segmented MOD-DFL 30 is 8.5 m and the diameter of the second segmented MOD-DFL 141 is 2.5 m.

In accordance with the representative embodiment shown in FIGS. 10A-10C, a solar panel 150 is secured to the balloon 120 in the equatorial region of the balloon 120. Electrical power generated by the solar panel 150 can be used to power the instrument package 132 and any other electrically-powered devices within or on the balloon 120.

The estimated power requirements of the MOD-DFL telescopes are smaller than the power requirements of large space telescopes and, therefore, are not expected to pose a significant challenge. The major systems requiring energy will typically be communications, spacecraft attitude control, and the instrument package; similar components exists on the Hubble Space Telescope, James Webb Space Telescope, and Herschel Space Observatory, all powered via solar cell arrays. It is believed that the solar panels 150 will be more than sufficient to meet power requirements. The power can be stored in batteries on board the MOD-DFL telescopes, providing a stable power source when the solar array is not illuminated.

In accordance with an embodiment, the MOD-DFL telescopes use four reaction wheels (all offset for the inertial axes) to manage the rotation (pointing, tracking) of the telescopes along three axes (a fourth wheel provides redundancy). The reaction wheels will spin in the direction opposite to the intended rotation of the telescopes. The MOD-DFL telescopes—like any spacecraft—will be subjected to net torques (primarily due to asymmetric exposure to solar irradiation and solar wind pressure).

Although the reaction wheels will ensure stable pointing during operations, the MOD-DFL telescopes may periodically need to dump angular momentum. A passive mechanism and an active mechanism may be used for this purpose. In a passive angular momentum management mode—as the distribution of transiting planets is closely isotropic on the sky—each unit telescope's observing schedule can be planned in such a way to average out torques. In an active angular momentum management mode, ambient-temperature pressurized nitrogen can be released through thrusters affixed to the exterior of the Mylar balloon (possibly at the connecting points of the lock-in-struts). Nitrogen does not affect the planned observations and will not react with or freeze onto the spacecraft. Given the unusually symmetric architecture of the unit telescopes, net torques will be lower than they are for most other spacecraft architectures, resulting in a much lower than typical rate of angular momentum accumulation.

The driver for the guiding stability is the high photometric precision: pointing drifts, combined with detector sensitivity variations and possible position-dependent systematics, which can introduce apparent position-dependent intensity variations. While significant reduction in the power of such systematics is possible via post-processing (such as in the Kepler mission), it is desirable to keep image drifts at or below the level of the diffraction-limited spatial resolution of the telescope. Therefore, a guiding precision of approximately 15 mas/10 hr may be targeted. The MOD-DFL telescopes can use the sun as a coarse attitude reference point and the anti-solar starfield for precise pointing position measurements. The unit telescopes can use the target stars and reference stars within the field of view for fine guiding during long exposure series.

With respect to thermal management, at an orbit with an average distance of 1 au from the Sun, the MOD-DFL telescopes may operate close to room temperature (25° C.) with only modest active thermal management (heating). The inflatable balloons of the MOD-DFL telescopes will protect the instrument package in the interior from large temperature excursions, as the nitrogen gas and emission/absorption within the balloon redistribute heat. Nevertheless, the high-precision measurements may require a thermally stable system (instrument package, lens alignment, and lens itself). Therefore, the MOD-DFL telescopes preferably will actively control the temperature of the elements within the spacecraft and of the MOD-DFL itself. Heating can be provided by battery-powered thermoelectric cells, and excess heat can be dumped at the dark (non-illuminated) side of the telescopes, possibly through a metal ring surrounding the MOD-DFL (as MOD-DFL lenses are not exposed to the Sun during normal operations).

With respect to fabrication of the MOD-DFLs, due to their non-continuous surface microstructures, the MOD-DFLs will typically not be fabricated through traditional grinding and polishing methods. Potential fabrication methods for non-continuous surfaces include diamond turning, and molding, gray-scale lithography, deep-reactive ion etching, UV imprinting, and glass slumping. Among these, diamond turning and molding are the most powerful approaches for MOD-DFL fabrication due to their accuracy and scalability. The combination of diamond turning and pressure molding offers very powerful and flexible fabrication paths for MOD-DFLs: diamond turning of the molds enables precise fabrication and pressure molding with the molds enables reliable and low-cost replication (e.g., epoxy replication).

Ultra-precision diamond-turning machines have been successfully used to fabricate conventional lenses as well as diffractive optical elements (e.g., Lee & Cheung 2003; Huang & Liang 2015). For example, state-of-the-art Moore Nanotech 350FG freeform generators are capable of diamond turning or milling MOD-DFLs or MOD-DFL segments with diameters up to 0.6 m. Precision glass compression molding is a replicative process that allows the production of high-precision optical components from glass and polymer (Zhang & Liu 2017), including those of diffraction surfaces (Huang et al. 2013; Nelson et al. 2015). By using chalcogenide glasses, precision molding also allows replicating optical elements for infrared applications (Staasmeyer et al. 2016). Compression molding has been successfully used to mold glass freeform optics from diamond-machined molds (He et al. 2014).

The inventors have combined diamond turning/milling to fabricate molds and used the molds to glass press mold the MOD-DFLs. To illustrate the fabrication approach, the inventors diamond-turned molds and molded the MOD-DFL from poly(methyl methacrylate). The measured lens profile and image quality verified the molded surface shape and quality. The inventors believe this approach can be used to fabricate and replicate very large-aperture MOD-DFLs at low cost. As part of the MOD-DFL development effort at The University of Arizona, the inventors designed and fabricated several generations of MOD-DFLs, from single-order to more complex (M=1,000) MOD-DFLs.

Unlike reflecting telescopes, the MOD-DFL design is inherently more tolerant to optical element misalignments, a fact that will significantly reduce fielding costs. If a mirror orientation is tilted by angle α, the reflecting beam will be off by 2α, which requires a very tight alignment tolerance and complex control solutions. However, with a basic first-order geometrical optics analysis, a chief ray going through the center of a refractive lens does not change its direction although the lens is tilted. In a similar manner, transmissive refractive/diffractive optics are insensitive to surface figure errors including mid-to-high spatial frequency errors. For example, an anomaly with height h on a mirror surface in space will induce 2 h Optical Path Length (OPL) change due to its double-path nature.

However, for a lens with refractive index of n, the same surface anomaly will cause only (n−1)×h OPL difference, i.e., only ~0.5 h change in OPL (assuming a typical n=1.5). Also, if the thin MOD-DFL is bending or locally rippling while it is maintaining the thickness of the MOD-DFL, there is almost no OPL change since the front and back surfaces are moving together. This robustness of the alignment and shape error tolerance is one of the most fundamental strengths of the MOD-DFL telescope system.

The MOD-DFL design benefits from a potential for greatly reduced launch costs through four factors. Firstly, MOD-DFL-based telescopes will be much lighter than telescopes based on monolithic mirrors and about as light as the lightest segmented mirror systems. Secondly, with the typically two orders-of-magnitude more relaxed alignment tolerances, the structural support requirements are milder and allow for the use of light-weight structural elements, such an inflatable deployment mechanisms. The light-weight and inflatable structural elements represent significant further reductions in the telescope's mass. Thirdly, MOD-DFL systems can provide simultaneously fast systems (small focal ratios) and wide field of view. This allows the MOD-DFL telescopes to be very compact (f/1.0 systems), thus alleviating the need for light path folding and secondary mirrors. Fourthly, the very compact launch configuration and low weight enables the simultaneous launch of many unit telescopes in a single launch fairing (e.g., up to 15 with SpaceX/BFR or 25 with NASA SLS B2 Long). This dramatically reduces the per-telescope launch costs.

It should be noted that the inventive principles and concepts have been described with reference to representative embodiments, but that the inventive principles and concepts are not limited to the representative embodiments described herein. Although the inventive principles and concepts have been illustrated and described in detail with reference to the drawings, such illustration and description are to be considered illustrative or exemplary and not restrictive; the invention is not limited to the disclosed embodiments. Variations to the disclosed embodiments can be understood and effected by those skilled in the art, from a study of the drawings, the disclosure, and the appended claims. For example, although the inventive principles and concepts have been described with reference to a balloon being used as a deployment device for the telescope, the MOD-DFL is not limited to being deployed on a balloon or any particular type of deployment device. Also, while examples of the MOD-DFL dimensions have been provided above, the MOD-DFL is not limited to having any particular dimensions.

What is claimed is:

1. A spectroscopy system comprising:
   a sensor;
   a deployment device; and
   a multi-order diffractive Fresnel lens (MOD-DFL) comprising a plurality of MOD-DFL segments secured to a mounting surface of the deployment device in a preselected arrangement to form the MOD-DFL on the mounting surface, wherein the preselected arrangement of the plurality of MOD-DFL segments forms a MOD-DFL surface profile comprising N transitions in a top surface of a MOD-DFL array at N radial positions, respectively, from a center axis of the MOD-DFL array, where N is a positive integer that is greater than or equal to 2, each of the transitions occurring at a respective zone boundary and having a step height in a direction nearly parallel to the center axis, where spectral components of illumination of the MOD-DFL are distributed across a direction in space on the sensor.

2. The spectroscopy system of claim 1, wherein the MOD-DFL surface profile is a continuous curve from the center axis to a closest of the N transitions to the center axis.

3. The spectroscopy system of claim 2, wherein the continuous curve is aspherical in shape.

4. The spectroscopy system of claim 1, wherein the MOD-DFL is an $M^{th}$ order MOD-DFL, where M is a positive integer that is greater than or equal to 250, and wherein the step height is the same for all of the transitions and is greater than or equal to 0.25 millimeters (mm).

5. The spectroscopy system of claim 1, wherein the step height is greater than or equal to 0.50 millimeters (mm).

6. The spectroscopy system of claim 1, wherein the transitions near an outer edge of the MOD-DFL are separated from one another by smaller radial distances than transitions near the center axis.

7. The spectroscopy system of claim 1, wherein the MOD-DFL is an $M^{th}$ order MOD-DFL, where M is a positive integer that is greater than or equal to 250.

8. The spectroscopy system of claim 1, wherein the step height is the same for all of the transitions and is greater than or equal to 0.25 millimeters (mm).

9. The spectroscopy system of claim 1, wherein the step height is the same for all of the transitions and is greater than or equal to 0.25 millimeters (mm).

10. A spectroscopy system, comprising:
a deployment device, wherein the deployment device is an inflatable balloon; and
a multi-order diffractive Fresnel lens (MOD-DFL) comprising a plurality of MOD-DFL segments secured to a mounting surface of the deployment device in a preselected arrangement to form the MOD-DFL on the mounting surface, wherein the preselected arrangement of the plurality of MOD-DFL segments forms a MOD-DFL surface profile comprising N transitions in a top surface of a MOD-DFL array at N radial positions, respectively, from a center axis of the MOD-DFL array, where N is a positive integer that is greater than or equal to 2, each of the transitions occurring at a respective zone boundary and having a step height in a direction nearly parallel to the center axis,
the inflatable balloon comprising:
an optics system disposed inside of the balloon that receives light of one or more preselected wavelengths coupled onto the optics system by the respective MOD-DFL and directs at least a portion of the received light toward a first optical pathway; and
a camera disposed along the first optical pathway inside of the balloon, the camera receiving light directed toward the first optical pathway by the optics system and generating one or more images containing spectral information about the light of one or more preselected wavelengths.

11. The spectroscopy system of claim 10, wherein the optics system includes a beam splitter that directs a first portion of the light received by the optics system toward the first optical pathway and directs a second portion of the light received by the optics system onto a second optical pathway.

12. The spectroscopy system of claim 11, further comprising:
one or more lenses of the optics system that receive the light coupled onto the optics system by the MOD-DFL and direct the light in a first direction;
a deformable mirror of the optics system that receives light directed in the first direction by said one or more lenses and directs the received light onto the first optical pathway toward the beam splitter and the camera;
a wavefront diagnostics (WD) instrument disposed along the second optical pathway inside of the balloon, the WD instrument receiving the second portion of the received light and controlling the deformable mirror to perform image deformity correction;
a dispersing optical element of the optics system disposed in between the beam splitter and the camera, the dispersing optical element separating the first portion of the light into a spectrum of angles according to said one or more preselected wavelengths; and
one or more lenses of the optics system that couple the spectrum of angles onto the camera.

13. The spectroscopy system of claim 10, wherein the MOD-DFL surface profile is a continuous curve from the center axis to a closest of the N transitions to the center axis.

14. The spectroscopy system of claim 13, wherein the continuous curve is aspherical in shape.

15. The spectroscopy system of claim 10, wherein the MOD-DFL is an $M^{th}$ order MOD-DFL, where M is a positive integer that is greater than or equal to 250, and wherein the step height is the same for all of the transitions and is greater than or equal to 0.25 millimeters (mm).

16. The spectroscopy system of claim 10, wherein the step height is greater than or equal to 0.50 millimeters (mm).

17. The spectroscopy system of claim 10, wherein the transitions near an outer edge of the MOD-DFL are separated from one another by smaller radial distances than transitions near the center axis.

18. The spectroscopy system of claim 10, wherein the MOD-DFL is an $M^{th}$ order MOD-DFL, where M is a positive integer that is greater than or equal to 250.

* * * * *